United States Patent [19]

Rubin

[11] Patent Number: 5,530,752
[45] Date of Patent: Jun. 25, 1996

[54] SYSTEMS AND METHODS FOR PROTECTING SOFTWARE FROM UNLICENSED COPYING AND USE

[75] Inventor: Robert J. Rubin, Richardson, Tex.

[73] Assignee: Convex Computer Corporation, Richardson, Tex.

[21] Appl. No.: 199,686

[22] Filed: Feb. 22, 1994

[51] Int. Cl.$^6$ ..................................................... H04L 9/00
[52] U.S. Cl. .................................. 380/4; 380/23; 380/25; 380/49
[58] Field of Search .............................. 380/3, 4, 23, 24, 380/25, 49, 50

[56] References Cited

U.S. PATENT DOCUMENTS

| | | | |
|---|---|---|---|
| 4,168,396 | 9/1979 | Best | 380/4 |
| 4,525,599 | 6/1985 | Curran et al. | 380/4 |
| 4,791,565 | 12/1988 | Dunham et al. | 380/4 X |
| 4,888,798 | 12/1989 | Earnest | 380/4 |
| 4,930,073 | 5/1990 | Cina, Jr. | 380/23 X |
| 5,319,705 | 6/1994 | Halter et al. | 380/4 |

*Primary Examiner*—David C. Cain
*Attorney, Agent, or Firm*—Fulbright & Jaworski

[57] ABSTRACT

Disclosed are systems and methods for protecting a software program from unauthorized use and copying through the removal at least one of a plurality of instructions comprising a software program, and encrypting the removed instruction utilizing an encryption algorithm to produce an encrypted instruction, the encryption algorithm responsive to a randomly generated key.

25 Claims, 5 Drawing Sheets

SYSTEMS AND METHODS FOR PROTECTING SOFTWARE FROM UNLICENSED COPYING AND USE

TECHNICAL FIELD OF THE INVENTION

This invention relates in general to the protection of computer software, and more particularly to improved systems and methods for protecting software programs and software utility libraries from unlicensed copying and use.

BACKGROUND OF THE INVENTION

Programs are sets of instructions for an ordered series of actions which cause processing systems hardware, such as a computer, to carry out specific tasks. Programs as a whole are divided into a number of categories based on the types of tasks performed. The two primary program categories are systems and applications programs. Systems programs, such as a personal computer operating system, are operable to control the inner workings of a processing system. In contrast, applications programs address the multitude of tasks for which processing systems are used. Systems programs thus handle such essential, but often invisible, chores as maintaining disk files and managing video screens, whereas applications programs perform such tasks as word processing and database management. Two additional categories of programs which are neither systems nor applications programs, although they contain elements of both, are network programs, which enable groups of processing systems to communicate, and language programs, which provide programmers with the means for writing all four types of programs.

Software is a special form of program which has been recorded onto a storage medium, such as a compact disc, a videotape or a floppy disk. Software enables programs to be easily transferred or copied from one storage medium to another. Further, software enables programs to be reused infinitely, avoiding the tedious task of reentering a program manually into the processing system hardware each time the program is used. Programs are often developed, and supported, by Software Houses for their customers, the end users. Software Houses distribute their programs as software and generally generate their profits either through sales revenues and/or licensing royalties.

Sales prices and licensing royalty rates are most often calculated based upon the maximum number of copies of a program which a particular customer intends to utilize. Software Houses are generally required to rely upon the honesty of customers when setting sales prices and licensing royalty rates because, as previously introduced, software may be freely copied. Thus, once the software has been distributed to the customer, the Software House has no realistic means for determining whether the software has been copied to a greater number of mediums than previously agreed upon by the Software House and its customer.

Accordingly, one object of the present invention is to ensure that purchasers or licensees of software do not improperly copy and utilize stored programs.

A second object of the invention is to provide a software security system and method which is fast, efficient and reliable.

A third object of the invention is to provide a security system and method which does not detrimentally impact run-time performance of protected programs.

A fourth object of the invention is to provide a security system and method which is cost effective to implement.

SUMMARY OF THE INVENTION

A selected embodiment of the present invention is a processing system for protecting a software program from unauthorized use and copying. The processing system includes an input port for receiving the software program which is comprised of one or more instructions, and means operable to remove at least one of the instructions from the software program, to randomly generate a key, to encrypt the removed instruction utilizing an encryption algorithm to produce an encrypted instruction in response to the randomly generated key, and insert at least on trappable in place of said encrypted instruction within the software program allowing the software program to be linked with one or more other executable programs.

A second embodiment of the present invention is a processing system for decrypting an encrypted software program, the encrypted software program including a non-executable data area and one or more executable instructions. The non-executable data area includes at least three data sub-areas. The processing system includes an input port for receiving the encrypted software program, a first means for retrieving the version number of the software program from a first data sub-area and for retrieving a licensed version number from a license manager for the software program, and a second means, enabled when the licensed version number is not less than the version number of the software program, for retrieving at least one encrypted instruction from a second data sub-area, retrieving a key from a third data sub-area, decrypting the encrypted instruction in response to the key, and inserting the decrypted instruction into the software program.

A selected method of operation of the present invention is for protecting a software program from unauthorized use and copying. This method includes the steps of receiving the software program which includes one or more instructions, removing at least one of the instructions from the software program, randomly generating a key and encrypting the removed instruction in response to the key, and producing an encrypted instruction as a result thereof.

A second method of operation of the present invention is for decrypting an encrypted software program (which includes both a non-executable data area, comprised of at least three data sub-areas, and one or more executable instructions). This method includes the steps of receiving the encrypted software program, retrieving the version number of the software program from a first data sub-area and retrieving a licensed version number from a license manager for the software program. If the licensed version number is not less than the version number of the software program then the method teaches the steps of retrieving at least one encrypted instruction from a second data sub-area and a key from a third data sub-area, and decrypting the encrypted instruction in response to the key.

A major technical advantage of the invention is that purchasers or licensees of software cannot improperly copy and utilize stored programs.

A further technical advantage of the invention is that a security system and method are taught which are fast, reliable and efficient.

A still further technical advantage of the invention is that a security system and method are taught which do not detrimentally impact run-time performance of protected programs.

Another technical advantage of the invention is that a security system and method are taught which are cost effective to implement.

The foregoing has outlined rather broadly the features and technical advantages of the present invention in order that the detailed description of the invention that follows may be better understood. Additional features and advantages of the invention will be described hereinafter which form the subject of the Claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1A:
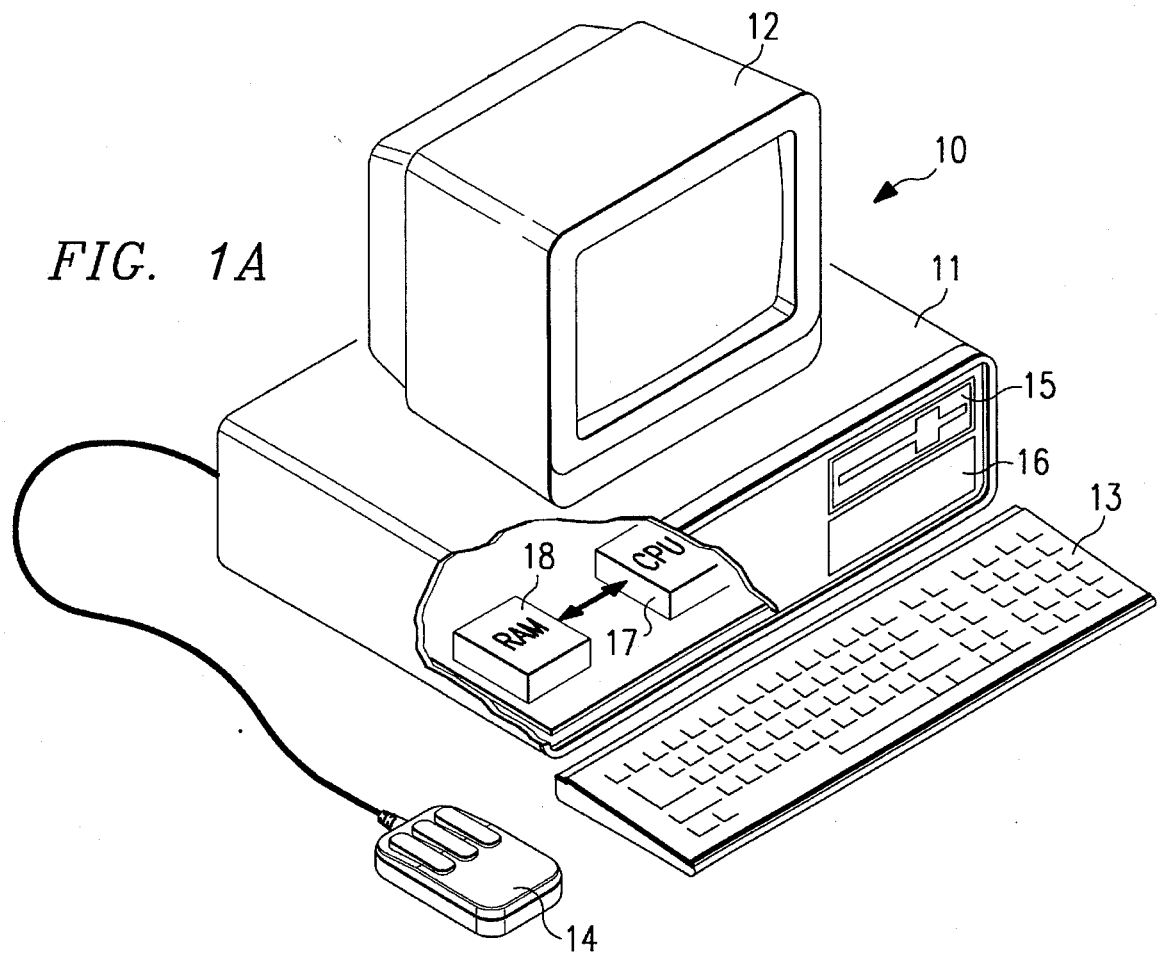
FIG. 1A illustrates an isometric view of a personal computer.

FIG. 1A illustrates an isometric view of a personal computer ("PC") 10. PC 10 is comprised of a hardware casing 11 having a cutaway view, a monitor 12, a keyboard 13 and a mouse 14. Hardware casing 11 includes both a floppy disk drive 15 and a hard disk drive 16. Floppy disk drive 15 is operable to receive, read and write to external disks. Although only floppy disk drive 15 is illustrated, PC 10 may be equipped with any structure for receiving and transmitting data, including for example, tape and compact disc drives, and serial and parallel data ports. Hard disk drive 16 is operable to provide fast access data storage and retrieval. Within the cutaway portion of hardware casing 11 is a Central Processing Unit ("CPU") 17 coupled with a Random Access Memory ("RAM") 18. Although PC 10 is utilized for illustrating one implementation of the invention, the invention may alternately be implemented within any processing system, including, for example, sophisticated calculators and hand-held, mini, main frame and super computers, not to mention combinations of the foregoing as well.

Figure 1B:
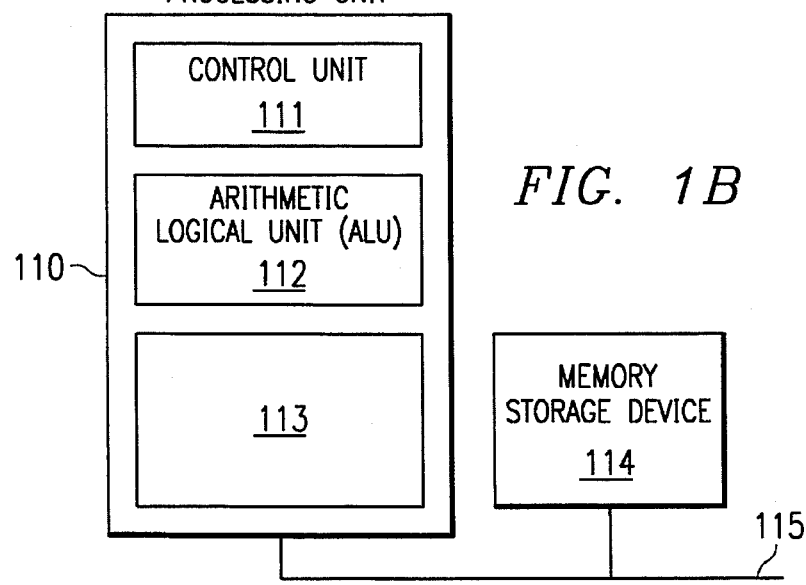
FIGURE 1B illustrates a conceptual block diagram of a processing system which may be utilized in conjunction with FIG. 1A.

FIG. 1B illustrates a conceptual block diagram of one of any number of processing systems which may be utilized in conjunction with FIG. 1A. The processing system includes a single processing unit 110, such as CPU 17, coupled via data bus 115 with a single memory storage device 114, such as RAM 18. Memory storage device 114 is operable to store one or more instructions which processing unit 110 is operable to interpret and execute. Processing unit 110 includes a control unit 111, an arithmetic logic unit ("ALU") 112, and a local memory storage device 113. Control unit 111 is operable to fetch instructions from memory storage device 114. ALU 112 is operable to perform a plurality of operations, including addition and Boolean AND needed to carry out the instructions. Local memory storage device 113 is operable to provide high-speed storage used for storing temporary results and control information. As will be discussed in greater detail with reference to FIGS. 2–5, the present invention, which provides protection for software from unauthorized/unlicensed use and copying through encryption of one or more instructions comprising the software, may be implemented within any processing system.

Computer programs are coded in source code. Source code is comprised of a plurality of human-readable program statements which are written in either high-level or assembly language by either by a software engineer or a software design tool, such as a CASE ("Computer Aided Software Engineering") tool. Source code is not directly executable by a processing system, and must therefore either be interpreted or compiled. If the source code is interpreted, the program is translated and executed at run-time on a statement by statement basis. If the source code is compiled, the program is translated into object/machine code prior to execution/run time. Object code is directly executable by a processing unit. Often in systems programming each program represents a single module among a plurality of modules comprising the system. Accordingly, the object code of each of the modules must be linked together to produce an executable system (including programs, subroutines, functions and libraries).

As previously introduced, sales prices and licensing royalty rates are most often calculated based upon the maximum number of copies of a program which a particular owner/licensee intends to utilize. Because software is so easily transferable, Software Houses loose large amounts of revenue through unlicensed copying and use which is often in the form of unlicensed linking of software programs with one or more other object code modules to form a system. In the illustrated embodiment, end users are precluded from improperly copying and utilizing software programs. This is accomplished efficiently and reliably through the implementation of the encryption methodology of the present invention.

Figure 2:
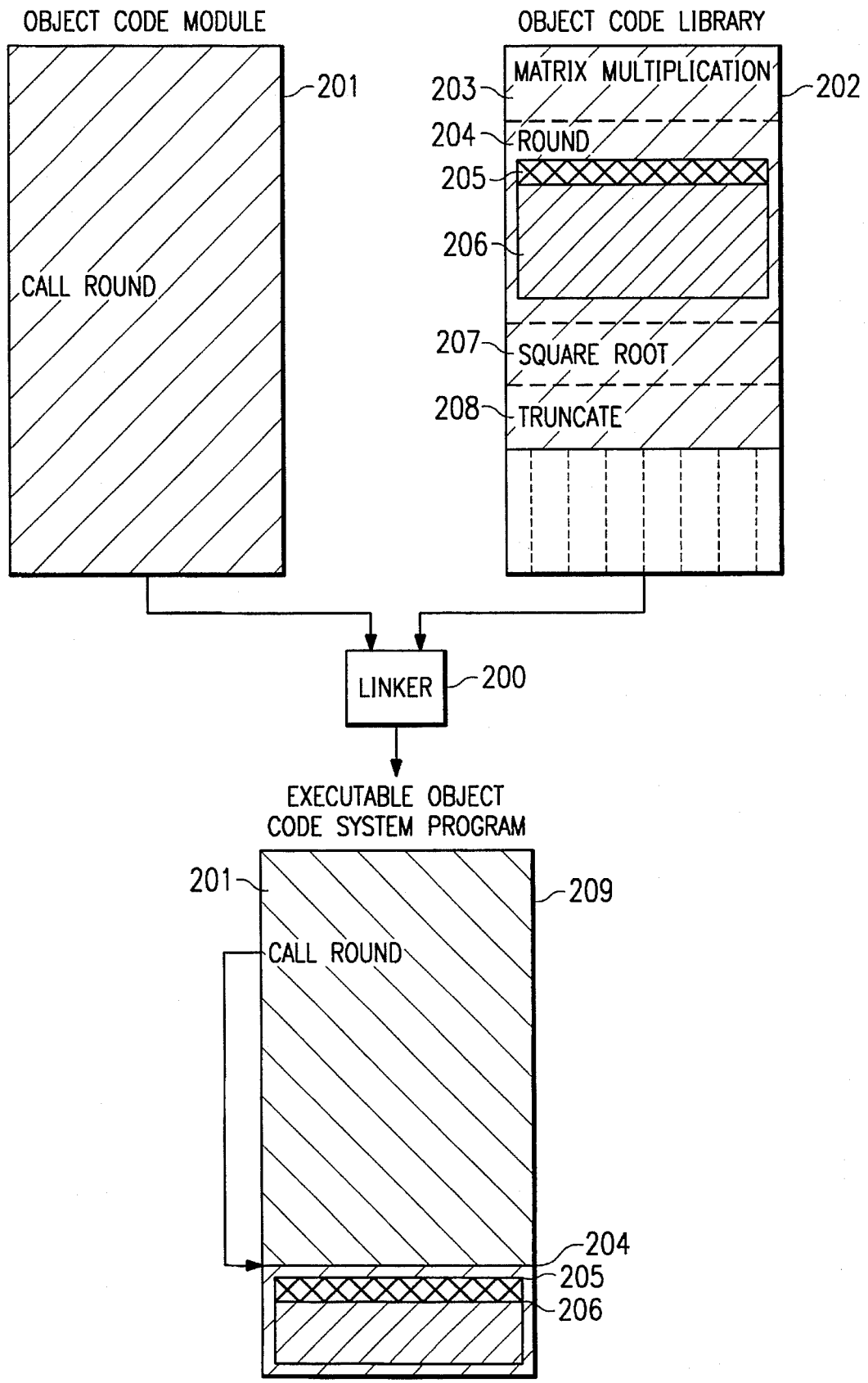
FIG. 2 illustrates a conceptual block diagram of the linking process.

FIG. 2 illustrates a conceptual block diagram of the linking process of the illustrated embodiment. There is illustrated an Object Code Module 201, an Object Code Library 202, a Linker 200 and a Executable Object Code System Program 209. Object Code Module 201 is a program written in either a high-level or assembly language, which has been compiled into object code. Object Code Module 201 includes a call to a rounding routine, ROUND module 204. Object Code Library 202 is a linkable math library ("LML") comprised of a plurality of previously compiled subroutines, functions and programs, included as examples are $MATRIX_{13}MULTIPLICATION$ 203, ROUND 204, $SQUARE_{13}ROOT$ 207 and TRUNCATE 208. Linker 200 is a program operable to link object code modules together to create an executable system program, Executable Object Code System Program 209. In the illustrated embodiment, Linker 200 receives, on an instruction by instruction basis, Object Code Module 201 as a first input. Upon interception of the instruction line calling ROUND module 204, Linker 200 requests and receives an object code copy of ROUND module 204 as a second input. The linking of Object Code Module 201 and ROUND module 204 forms Executable Object Code System Program 209.

Figure 3:
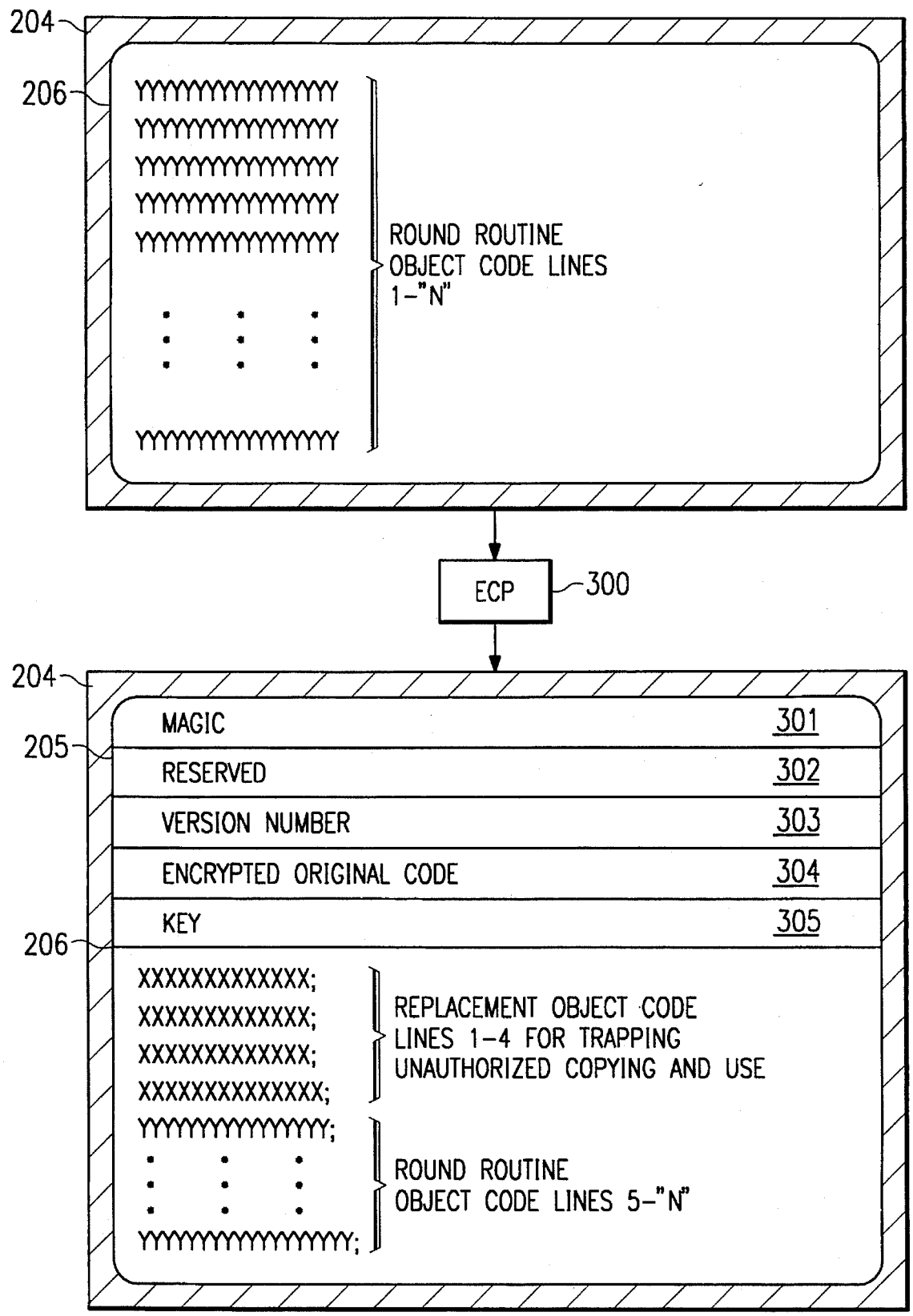
FIG. 3 illustrates a conceptual diagram of the encryption of the ROUND module of FIG. 2.

FIG. 3 illustrates a conceptual diagram of the encryption of ROUND module 204. In the prior illustration, LML 202 has been developed by a Software House for distribution. Prior to distribution, each of the programs comprising LML 202 are passed through an Encryption Conversion Process (hereinafter "ECP") 300 which is operable to add a small non-executable data area to each object code module comprising LML 202. In the illustrated embodiment, ECP 300 removes up to the first four lines of code from each object code module, replacing the removed lines of code with a privileged request which, if executed, will cause a trappable error. A further aspect of the illustrated embodiment, is to insert a call to an error message routine prior to the privileged instruction, informing the end user that they are making an unlicensed attempt to utilize the software program. ECP 300 then encrypts the removed lines of code and stores the encrypted lines of code within a data area 205. Because up to four lines of object code are encrypted prior to entering the link process, existence of the link table must be taken into consideration to avoid interference with the linking process. ROUND module 204 includes data area 205 and a plurality of object code instructions 206 for performing the round function. Data area 205 is comprised of a Magic sub-data area 301, a Reserved sub-data area 302, a Version Number 303, an Encrypted Original Code sub-data area 304 and a Key 305.

In the illustrated embodiment, the encrypted lines of code are stored in Encrypted Original Code sub-data area 304. The encryption process of the illustrated embodiment utilizes a simple bit-wise exclusive-or algorithm. The exclusive-or algorithm receives the removed lines of code and a key (which is randomly generated by ECP 300) as first and second inputs, respectively, and produces the encrypted lines of code as an output. The randomly generated key is stored in Key 305, and is a unique data item which serves to identify the encryption format of the object code module with which it is associated. Although a simple bit-wise exclusive-or algorithm has been utilized for the encryption process, no limitation exists which precludes the use of more or less sophisticated encryption algorithms. Note, a further aspect of the bit-wise exclusive-or algorithm is its "reversibility," i.e., passing the exclusive-or algorithm the encrypted lines of code and the associated key, as first and second input respectively, reproduces the original removed lines of code as an output, (the decryption process will be discussed in greater detail with reference to FIGS. 4 and 5). In the illustrated embodiment, Magic sub-data area 301 provides a flag which indicates the beginning of a data area 205, and a state indicator for indicating whether the associated data object is "unprotected" (object code instruction 206 in original form, data area 205 initialized), "protected," or "uninitialized." Reserved sub-data area 302 provides a storage area the value of which indicates the number of instructions affected by the encryption process. Lastly, Version Number 303 stores the current version number of the associated routine, which in the present illustration is ROUND module 204's version number.

Figure 4:
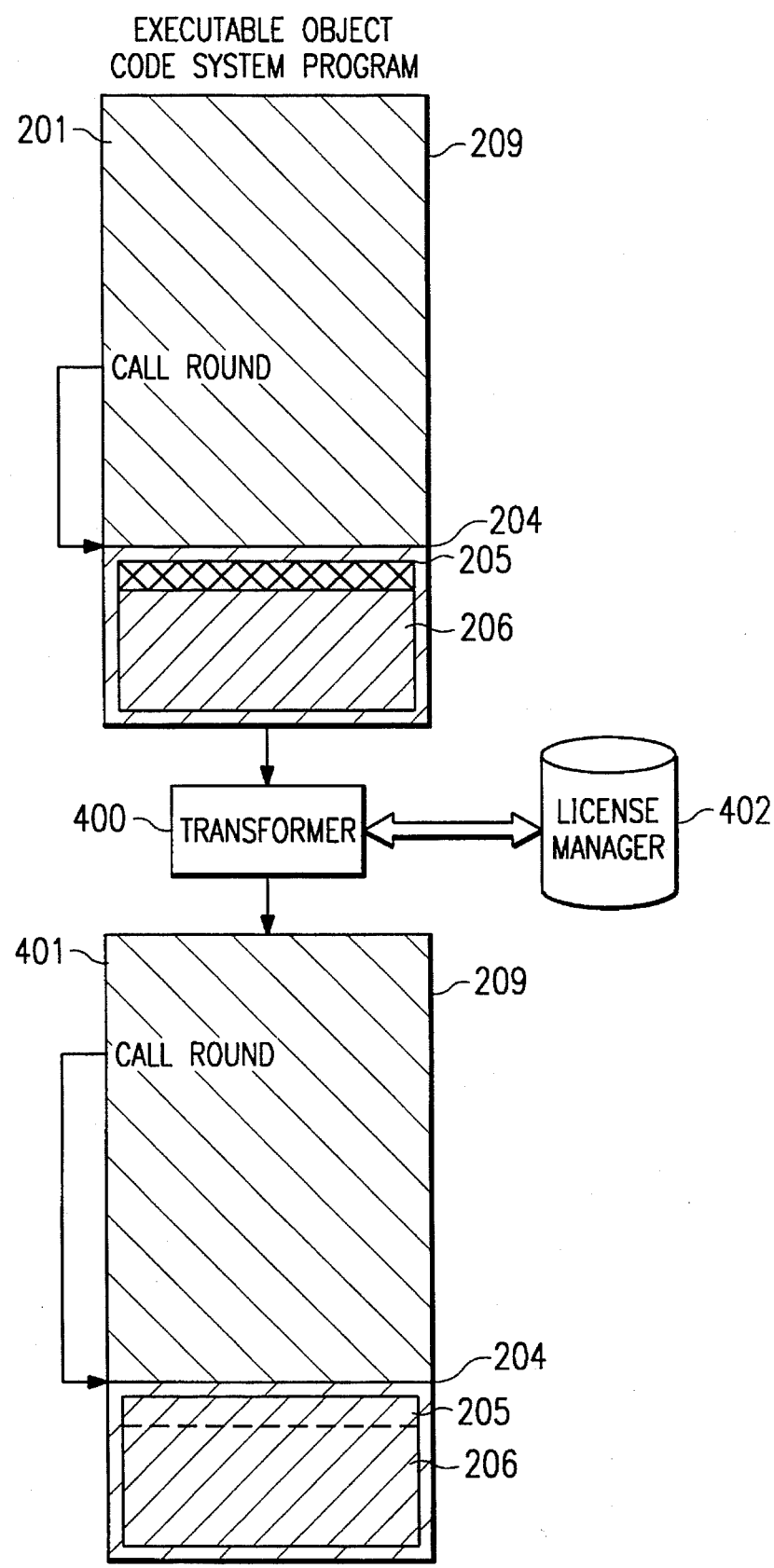
FIG. 4 illustrates a conceptual block diagram of the decryption process of the illustrated embodiment.

FIG. 4 illustrates a conceptual block diagram of the decryption process of the illustrated embodiment. There is illustrated Executable Object Code System Program 209, a Transformer 400, a Transformed Object Code System Program 401 and a License Manager 402. Executable Object Code System Program 209 includes Object Code Module 201 and ROUND module 204. Transformer 400 is operable to decrypt ROUND module 204 if the end user responsible for linking Object Code Module 201 and ROUND module 204 together, thereby creating Transformed Object System Program 401, has a license to copy and utilize ROUND module 204. License Manager 402 is a specialized program module which aids in the storage, manipulation, reporting, management and control of data related to the licensing of each of the object code modules of LML 202. License Manager 402 is enabled utilizing one or more processing units, such as processing unit 110. Transformer 400 and License Manager 402 are operable to transmit and receive data to and from one another as is discussed in conjunction with FIG. 5.

Figure 5:
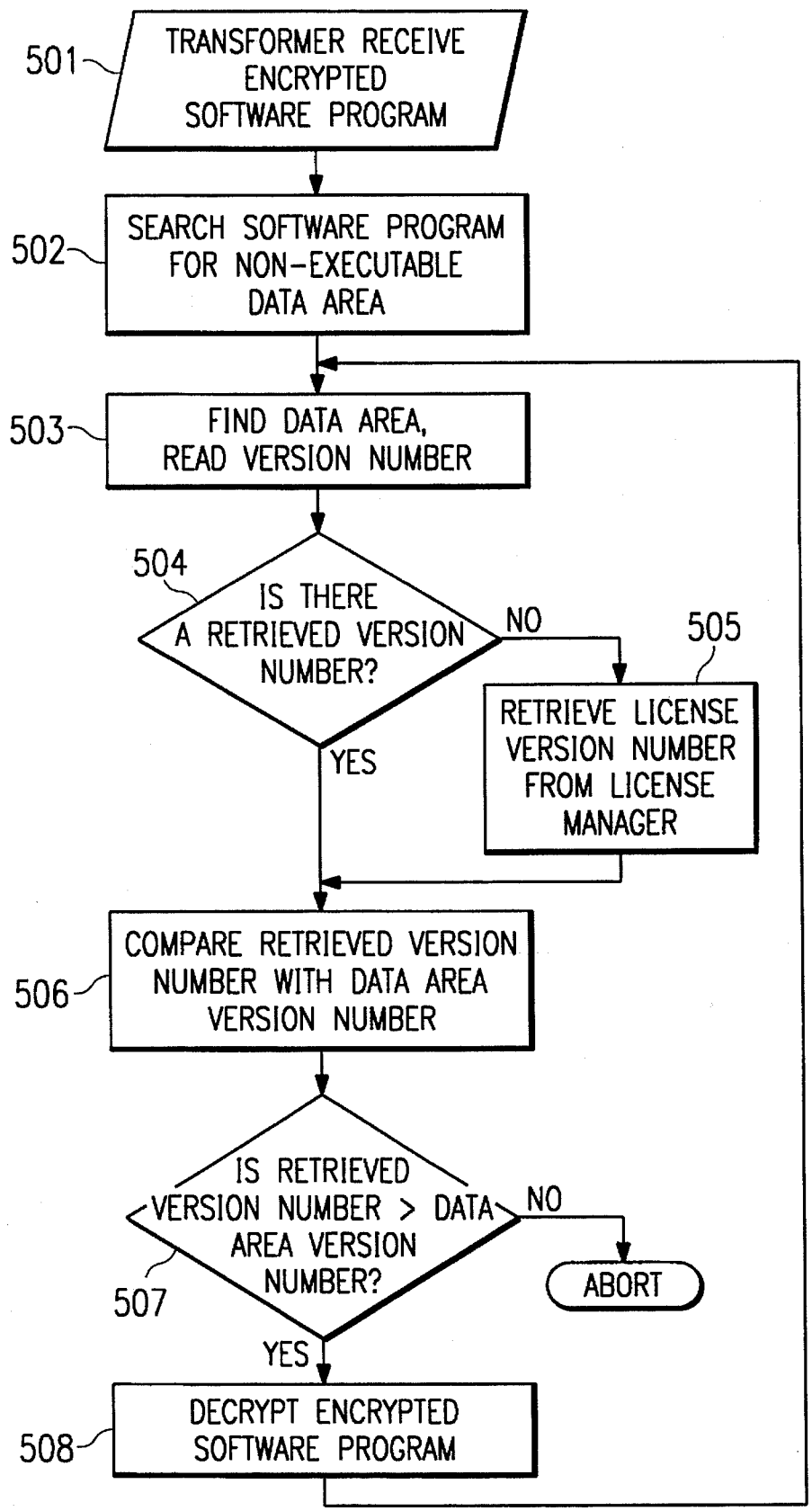
FIG. 5 illustrates a flow diagram of the preferred method of operation of the invention as carried out within the architecture of FIGS. 1A–B.

FIG. 5 illustrates a flow diagram of the preferred method of operation of the invention as carried out within the architecture of FIGS. 1A-B. Recall that Executable Object Code System Program 209 includes ROUND module 204 which has been previously disabled, and that during the execution of Executable Object Code System Program 209, if a branching instruction to ROUND module 204 is encountered, a trappable error will occur. Accordingly, following the linking process (FIG. 2) wherein one or more object code modules of LML 202 are linked with one or more Object Code Modules 201, the end user is required to pass Executable Object Code System Program 209 through Transformer 400 (Block 501). In the illustrated embodiment, Transformer 400 searches a symbol table associated with Executable Object Code System Program 209 for data areas 205 within Executable Object Code System Program 209 (Block 502). Upon interception of a data area 205, such as data area 205 of ROUND module 204, Transformer 400 reads Magic 301 to verify it is "protected," if it is not protected then this data area is skipped. If Magic 301 indicates that it is protected, then Transformer 400 accesses and reads the associated object code module's Version Number 303 (Block 503). Transformer 400, which in the illustrated embodiment maintains previously retrieved licensed version numbers in temporary storage, determines whether Round module 204's Version Number 303 has been previously retrieved (Decisional Block 504). If Round module 204's Version Number 303 has previously been retrieved, Transformer 400 will compare the retrieved licensed version number with Round module 204's Version Number 303 (Block 506). Alternatively, if Round module 204's Version Number 303 has not previously been retrieved (Decisional Block 504), then Transformer 400 requests and receives from License Manager 402 the latest version number for ROUND module 204 for which the user is licensed (Block 505). Transformer 400 stores the retrieved licensed version number in temporary storage and compares the retrieved licensed version number with Round module 204's Version Number 303 (Block 506).

If the licensed version number is less than Round module 204's Version Number 303, then the user is not licensed to utilize ROUND module 204, causing Transformer 400 to abort evaluation of Executable Object Code System Program 209 upon the determination that the user does not have a valid license to utilize ROUND module 204, and produce an error message informing the user, either through a visual display or a hardcopy, such as a printout, that the user does not have a valid license to utilize ROUND module 204. In an alternate embodiment, Transformer 400 will abort evaluation of ROUND module 204, and continue searching Executable Object Code System Program 209 for other data areas 205 within. Hence, a trappable error will occur following execution of a branching instruction to ROUND module 204 during execution of Executable Object Code System Program 209. Similarly, the trappable error will produce an error message informing the end user that he does not have a valid license to utilize ROUND module 204.

Alternatively, if the licensed version number is greater than or equal to Round module 204's Version Number 303 (Decisional Block 507), then ROUND module 204 is decrypted/enabled (Block 508). Recall that the illustrated embodiment utilizes a simple bit-wise exclusive-or to perform the encryption process, accordingly, to decrypt ROUND module 204, Transformer 400 retrieves Key 305 and Encrypted Original Code 304 from ROUND module 204's data area 205 and passes both through the previously discussed bit-wise exclusive-or algorithm thereby reproducing the originally removed lines of object code. The originally removed lines of object code are reinserted into ROUND module 204, replacing the previously inserted privileged instructions. Transformer 400 of present data area 205 updates magic 301 and then continues on searching Executable Object Code System Program 209 for other embedded data areas 205.

Although Transformer 400 has been illustrated as a stand alone program, an alternate embodiment of the invention would utilize a "run-time" Transformer 400 which stores and executes, i.e., decrypts, programs stored in volatile memory, such as RAM 18. Accordingly, once execution is complete, the decrypted program is erased and the non-volatile version of the encrypted program is never enabled on disk, i.e., a copyable storage medium.

Although the present invention and its advantages have been described in detail, it should be understood that various changes, substitutions and alterations can be made herein without departing from the spirit and scope of the invention as defined by the appended claims.

What is claimed is:

1. A processing system for protecting a software program from unauthorized use, said software program including one or more unencrypted instructions stored in memory associated with said software program, said processing system comprising:

a processing unit operable to:

remove at least one selected said unencrypted instruction from an executable area in said memory associated with executable portions of said program;

encrypt said at least one selected unencrypted instruction removed from said software program utilizing an encryption algorithm to produce an encrypted instruction;

store said encrypted instruction within a first non-executable data area in said memory associated with said software program; and insert at least one trappable instruction in place of said encrypted instruction within said executable area in memory allowing said software program to be linked with one or more other programs.

2. The processing system as set forth in claim 1 wherein said processing unit further includes:

means for randomly generating a key, said randomly generated key operable to control said encryption algorithm.

3. The processing system as set forth in claim 2 wherein said processing unit is further operable to:

store said key in a second non-executable area in said memory associated with said software program.

4. The processing system as set forth in claim 1 wherein a first trappable instruction is operable to:

generate a message to a user.

5. The processing system as set forth in claim 1 wherein said processing unit is further operable to:

store a flag for indicating that said software program is encrypted in a second non-executable data area in memory associated with said software program.

6. A processing system for decrypting an executable-linkable software program, said software program stored in an associated area in memory, said program including one or more unencrypted instructions and a current version number stored in a first data sub-area within said associated data area in memory, said processing system comprising:

a processing unit operable to compare said current version number against a retrieved licensed version number associated with said software program to determine validity of use of said software program, said processing unit further operable upon a determination of validity of said software program to:

retrieve an encrypted instruction from a second data sub-area within said area in memory, said encrypted instruction having been generated from an unencrypted instruction selectively removed previously from said program stored in said area in memory and encrypted;

decrypt said encrypted instruction utilizing a decryption algorithm; and insert said decrypted instruction into said software program stored in memory.

7. The processing system as set forth in claim 6 wherein said processing unit is further operable to:

retrieve a key from a third data sub-area within said area in memory, said key operable to control said decryption algorithm.

8. The processing system as set forth in claim 6 further including:

a license manager program operable to control storage of said retrieved license version number within a memory storage device.

9. The processing system as set forth in claim 6 wherein said processing system further includes:

means for temporarily storing said retrieved licensed version number within fast access memory.

10. The processing system as set forth in claim 6 wherein said processing unit is further operable to:

remove a trappable instruction from said encrypted software program, said trappable instruction having been inserted in said program stored in memory in place of said removed instruction.

11. A method for protecting a software program containing one or more unencrypted instructions from unauthorized use and copying, said method comprising the steps of:

encrypting at least one of said unencrypted instructions from said software program utilizing an encryption algorithm to produce an encrypted instruction;

storing said encrypted instruction within a first non-executable data area within said software program; and inserting at least one trappable instruction in place of said encrypted instruction within said software program allowing said software program to be linked with one or more other programs.

12. The method as set forth in claim 11 wherein said method further includes the step of:

generating a key, said generated key operable to control said encryption algorithm.

13. The method as set forth in claim 11 wherein said method further includes the step of:

storing said key within a second non-executable data area within said software program.

14. The method as set forth in claim 11 wherein a first trappable instruction generates a message to a user.

15. The method as set forth in claim 11 further including the step of:

storing a flag indicating that said software program is encrypted in a second non-executable data area.

16. A method for decrypting an encrypted software program, said encrypted software program stored in an associated memory including a non-executable data area, said program including, in memory, one or more unencrypted instructions and a current version number stored in a first data sub-area within said data area in memory, said method comprising the steps of:

comparing said current version number against a retrieved licensed version number associated with said encrypted software program to determine validity of use of said encrypted software program, upon a determination of validity of said encrypted software program, said method further comprising the steps of:

retrieving an encrypted instruction from a second data sub-area within said non-executable data area, the encrypted instruction having been generated from an unencrypted instruction selectively removed from said program stored in memory and encrypted;

decrypting said encrypted instruction utilizing a decryption algorithm; and inserting said decrypted instruction into said encrypted software program stored in memory.

17. The method as set forth in claim 16 wherein said method, upon a determination of validity of said encrypted software program, further includes the step of:

retrieving a key from a third data sub-area within said non-executable data area.

18. The method as set forth in claim 17 wherein said method further includes the step of:

inputting said key into said decryption algorithm, said key operable to control said decryption algorithm.

19. The method as set forth in claim 16 wherein said method, upon a determination of validity of said encrypted software program, further includes the step of:

removing a trappable instruction from said encrypted software program, the trappable instruction having been inserted in the program in place of the removed instruction.

20. The method as set forth in claim 16 wherein said method, upon a determination of validity of said encrypted software program, further includes the step of:

temporarily storing said retrieved licensed version number within fast access memory.

21. The method as set forth in claim 16 further including the step of:

removing a privileged instruction from said software program, the privileged instruction having been inserted in the program in place of the removed instruction.

22. A computer, including a keyboard, a display monitor, at least one processing unit and at least one memory storage device, for protecting an unencrypted software program stored in an associated area in memory in said memory storage device from unauthorized utilization, said computer comprising:

an output port for outputting data to said display monitor;

an input port for receiving said software program containing one or more unencrypted instructions, said software program including means for indicating whether said software program is encrypted;

an encryption processor, responsive to said indicating means, for encrypting said software program, said encryption processor operable to:

remove at least one selected said unencrypted instruction from an executable sub-area of said area in memory associated with said program;

encrypt said at least one selected unencrypted instruction utilizing an encryption algorithm to produce an encrypted instruction;

store said encrypted instruction within a first non-executable data sub-area in said memory area associated within said software program; and insert at least one trappable instruction in place of said encrypted instruction within said executable sub-area in memory allowing said software program to be linked with one or more other executable programs; and a transformer processor, responsible to said indicating means, for decrypting said software program, said transformer processor operable to:

retrieve a current version number from a second non-executable data area within said software program;

retrieve a licensed version number from a data storage device when a temporary storage device is empty, and store said retrieved licensed version number in said temporary storage device; and compare said current version number against said licensed version number to determine validity of use of said software program, said transformer processor further operable upon a determination of validity of said software program to:

retrieve an encrypted instruction from said first non-executable data sub-area in memory;

decrypt said encrypted instruction utilizing a decryption algorithm; and insert said decrypted instruction into said software programming said executable sub-area in memory.

23. The computer as set forth in claim 22 wherein said encryption processor is further operable to:

set said indicating means to indicate that said software program is encrypted.

24. The computer as set forth in claim 23 wherein said computer further includes:

means responsive to execution of said trappable instruction for outputting a message to said output port.

25. The computer as set forth in claim 23 wherein said encryption processor further includes:

means for generating and storing a key in a third non-executable data area within said software program, said key operable to control said encryption algorithm.

* * * * *